Aug. 2, 1966   M. H. LILL   3,264,041
ROLLER BEARING ARRANGEMENT
Original Filed Aug. 18, 1961
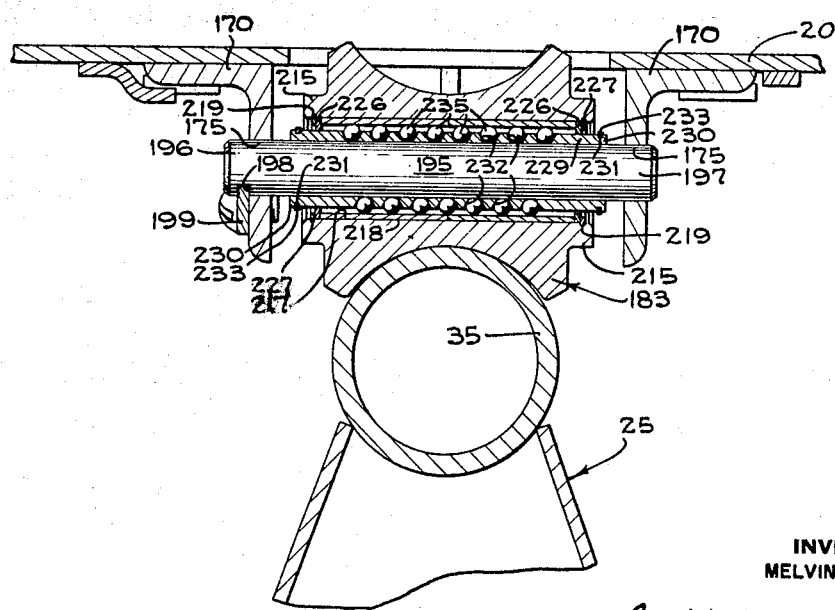
INVENTOR
MELVIN H. LILL
BY Hans G. Hoffmeister
ATTORNEY United States Patent Office 3,264,041
Patented August 2, 1966

3,264,041
ROLLER BEARING ARRANGEMENT
Melvin H. Lill, Lansing, Mich., assignor to FMC Corporation, San Jose, Calif., a corporation of Delaware
Original application Aug. 18, 1961, Ser. No. 132,473, now Patent No. 3,190,395. Divided and this application Oct. 13, 1964, Ser. No. 403,622
3 Claims. (Cl. 308—6)

The present application is a division of my prior copending application entitled, Vehicle Supporting Rack, Serial No. 132,473, filed August 18, 1961 now Patent No. 3,190,395.

The present invention pertains to a bearing and more particularly to a roller mounted on a shaft for relative rotational and axial movement of the roller and shaft.

It is an object of the present invention to provide a bearing including a roller mounted on a shaft for relative rotational and axial movement of the roller and shaft.

Another object is to provide a bearing in which said rotational and longitudinal movement is greatly enhanced by a ball bearing assembly.

Another object is to provide a bearing in which the ball bearing assembly thereof is conveniently accessible for repair and/or replacement.

Another object is to provide a roller bearing which is particularly suited for use in mounting a runway of a vehicle support rack.

These, together with other objects, will become apparent upon reference to the following description and accompanying drawing in which:

FIGURE 1 is a section of the bearing embodying the present invention.

The bearing of the present invention is conveniently described in association with a runway 20 for a vehicle supporting rack which is fully disclosed in the above identified copending application. A pair of roller mounting brackets 170 of angulated cross-section are rigidly secured under and to the runway. The brackets are extended transversely of the runway and are spaced longitudinally of the runway.

A shaft 195 which has opposite ends 196 and 197 extends through aligned holes 175 of the angle brackets 170. The rear end of shaft 195 has a transverse keyway 198 opening radially outwardly of the shaft. A key 199 is bolted to the adjacent bracket 170 and is extended into the keyway so as to preclude both axial and rotational movement of the shaft 195 relative to its bracket.

A roller 183 has opposite ends 215, an outer concave or hyperboloidal surface 216 of revolution concentrically circumscribing an axis for the roller and rollably engaging a rail 35 mounted on a pedestal 25 forming part of the vehicle supporting rack, an inner cylindrical surface 217 concentric to said axis and circumscribing a bore 218 receiving the shaft 195 therein, and annular end grooves 219 radially outwardly extended in the internal surface adjacent to the opposite ends of the roller.

An outer tubular two-piece race 225, preferably a thinwalled, hard steel sleeve, is press-fit in the bore 218. Inner washers 226 are fitted against opposite ends of the race within the bore, and retaining rings 227 are respectively received in the end grooves 219 for maintaining the race in axially fixed position within the roller. A tubular retaining cage 229 is fitted in the bore in circumscribing relation to the roller shaft 185. The cage is concentric to the shaft and is in inwardly circumferentially spaced relation to the race 225. The cage has opposite ends 230 adjacent to the opposite ends 215 of the roller. The ends of the cage have annular grooves 231 therein, and a plurality of circumferentially spaced, radially outwardly divergent, frusto-conical ball-receiving pockets 232 are formed in the cage. Outer retaining rings 233 are fitted in the grooves 231 in the opposite ends of the cage in opposed relation to the inner washers 226 at their respective ends of the roller. Spherical balls 235 are individually fitted in the pockets 232 for rollable contact with the race 225 and with shaft 195.

From the foregoing, it will be evident that a bearing has been described which includes a roller as 183 mounted on a shaft as 195 for relative rotational and axial movement of the shaft and roller. The movement of the roller relative to the shaft is greatly facilitated by a ball-bearing assembly, this assembly being readily accessible for repair and/or replacement. Although the bearing has been described for use in a vehicle supporting rack, it will be readily understood that it has utility in other environments.

Although a preferred embodiment of the present invention has been shown and described, it will be understood that various changes and modifications may be made in the details thereof without departing from the spirit and the scope of the appended claims.

Having thus described the invention, what is claimed as new and desired to be protected by Letters Patent is:

1. In combination, an annular roller having an axial bore extending through opposite ends thereof and an internal wall circumscribing said bore, a tubular race fitted in said bore against said wall, an elongated shaft extended through said bore in circumferentially spaced relation to said race, said shaft having opposite end portions projecting from the opposite ends of the roller when the roller is centered on the shaft, said shaft having a uniform diameter from one of said end portions to the other of said end portions, a tubular cage rotatably circumscribing said shaft within said race and having opposite ends, said cage being movable lengthwise of said shaft into positions adjacent one or the other of said end portions of the shaft, said cage providing a plurality of pockets radially extended therethrough, spherical balls individually fitted in said pockets and rollably engaging said shaft, said cage and said race, first abutment means secured to opposite ends of said roller and spaced a predetermined distance apart, and second abutment means secured to opposite ends of said cage in confronting relation to the respectively adjacent first abutment means and being spaced apart a greater distance than said predetermined distance, said roller and race being movable axially of said cage in opposite directions between limiting positions wherein the respectively adjacent abutment means are in engagement, said roller and race being rotatable relative to said cage and shaft, said balls facilitating said axial and rotatable movement.

2. The combination of claim 1 wherein the length of said cage is less than the length of said shaft but greater than the length of said roller.

3. The combination of claim 1 wherein said first abutment means are annular members mounted on and projecting inward from said roller, and wherein said second abutment means are annular members mounted on and projecting outward from said cage.

References Cited by the Examiner

UNITED STATES PATENTS

| | | | |
|---|---|---|---|
| 1,280,002 | 9/1918 | Englerth | 308—201 |
| 1,573,216 | 2/1926 | Zerbe | 308—7 |
| 1,622,880 | 3/1927 | Perkins | 308—189 |
| 1,975,292 | 10/1934 | Ross | 308—190 |
| 2,727,280 | 12/1955 | Waite | 302—208 X |
| 2,832,651 | 4/1958 | Berthiez | 308—6 |
| 2,929,572 | 3/1960 | Baumgartner | 308—6 |

FOREIGN PATENTS 43,437  8/1910  Austria.

DAVID J. WILLIAMOWSKY, *Primary Examiner.*

FRANK SUSKO, DON A. WAITE, *Examiners.*

L. L. JOHNSON, *Assistant Examiner.*